Aug. 22, 1939.   L. K. V. HELSTRUP   2,170,303
APPARATUS FOR GRINDING LIQUID OR SEMISOLID SUSTANCES
Filed Nov. 30, 1935

INVENTOR
LARS KRISTIAN VOLDSGAARD HELSTRUP
BY
Richards & Geier
ATTORNEYS

Patented Aug. 22, 1939

2,170,303

UNITED STATES PATENT OFFICE 2,170,303

APPARATUS FOR GRINDING LIQUID OR SEMISOLID SUBSTANCES

Lars Kristian Voldsgaard Helstrup, Frederiksberg, Denmark

Application November 30, 1935, Serial No. 52,355
In Denmark December 1, 1934

1 Claim. (Cl. 83—12)

The invention relates to a process and corresponding apparatus for heating, cooling, kneading, grinding or emulsification of liquid or semisolid substances, and the distinguishing feature of the process is that the said treatments are performed in helical threads cut into rollers by threading the surface thereof. The apparatus used consists of two or more mutually parallel rollers journalled in one common casing and fitted with right hand and, respectively, left hand threads engaging one another. The casing fits tightly about the threaded rollers and has, at one end, a supply pipe for the substance to be treated and, at the other end, a discharge pipe. One of the rollers is driven and drives, by way of a pair of cylindrical gear-wheels the other roller, in such a manner that the two rollers have different directions of rotation. By the meshing of the threads, each individual thread is stopped or sealed wholly or partly, in such a manner that the substance contained in the helical grooves will receive forward-driving impulses during the rotation of the rollers. The substance is thereby, without any difficulty, driven forward along the helical threads, even if the substance may have a very tough or solid consistency. All depending on the desired kind of treatment to be given the substance, the rotary speed of the rollers and the cross-sectional shape of the threads and the cooling device are varied, and the apparatus may thereby be given several embodiments, say 1 for cooling, 2 for kneading and grinding, and 3 for emulsifying.

Figure 1:
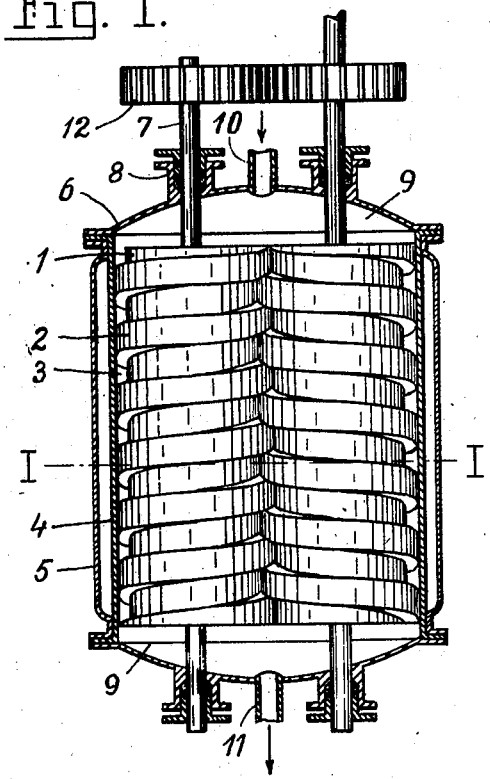
Figure 2:
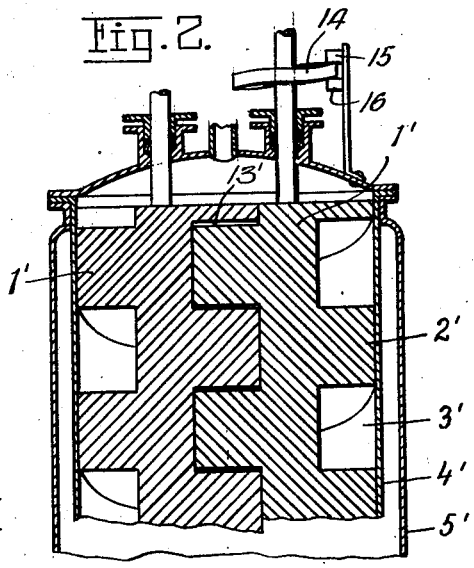
Figure 3:
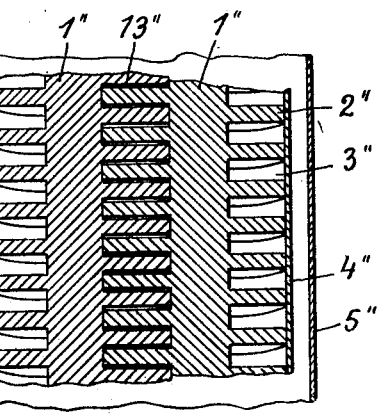

The drawing illustrates three constructions of the apparatus, all by sections along the plane of the roller axes, and Fig. 1 shows a cooling apparatus in which, however, the rollers are not cut through;

Fig. 2 shows a fractional part of a kneading or grinding apparatus;

Fig. 3 a fractional part of an emulsifying apparatus; and

Figure 4:
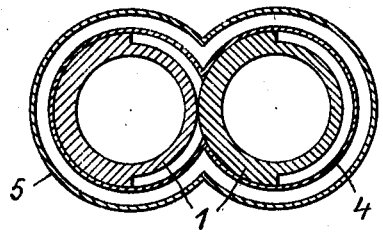

Fig. 4 a section along the line I—I of Fig. 1.

The two threaded rollers 1 of the cooling apparatus shown in Figs. 1 and 4 have projecting threads 2 and helical grooves 3, and are surrounded by a casing 4 with a cooling jacket 5. The casing is closed at the ends by means of covers 6, through which the shafts 7 of the rollers pass by way of stuffing boxes 8. At each end of the casing a space 9 is left between the covers and the roller ends. One of these spaces is connected to a supply pipe 10, and the other space is connected to a discharge pipe 11. The rotary motion of the rollers is governed by gear-wheels 12.

It is feasible to perform several treatments in one and the same apparatus, by giving two co-operating rollers different kinds of threads in the longitudinal direction, for instance in such a manner that ⅓ of the length has an emulsifying effect, ⅓ a cooling and ⅓ a kneading effect. The shape of the threads and the general construction of the apparatus may be of such a nature that several treatments can be performed simultaneously in the same thread. It will thus be feasible to perform emulsification and cooling simultaneously, or in such a manner that mainly emulsification is effected in combination with some cooling etc. Similarly, cooling and kneading may be effected simultaneously etc.

When the apparatus is to be used for cooling of for instance fat, fatty emulsions or soap, the threads on the rollers should be of relatively low depth.

The present invention enables a cooling to be performed in helical threads of the desired length and dimensions and best suited for the purpose. The cooling can then be performed quickly and effectively, and can be continued down to a rather firm consistency. The cooling is effected in that the casing 4 surrounding the rollers 1 is cooled, for instance in that the casing is fitted with a cooling jacket 5. If desired, the cooling may be assisted by cooling from the inside, through the rollers, which are then made hollow (Fig. 4), and are passed by the cooling liquid. The substance cannot adhere to the cooling walls, nor to any other part of the apparatus, as the threads of the rollers will constantly scrape and clean the inner faces of the casing, and similarly the thread of one roller will constantly clean the threads of the other roller. Hereby the uniform consistency of the substance will be secured. By their rotary motion, the threaded rollers will feed the treated substance forward automatically, even if the consistency of the substance be rather firm.

An especially quick and effective cooling is attained by making the cross-section of the thread very low. Then a cooling may be effected like in one of the known cooling drums for the cooling of margarine or fat, but in a highly improved and simplified manner. In the present apparatus, the fat is constantly moving during the cooling, which is very important, and gives a far better product. Without becoming coherent, the fat is cooled uniformly throughout by the present apparatus, because it is kept in constant motion. The cooling is effected quickly and effectively in rather thin layers, although not so exceedingly thin as in the cooling drum, which is not at all necessary here, and similarly the use of extremely low temperature is not required, but cold water will in many cases be sufficient.

The apparatus shown in Fig. 2 is to be used for kneading of margarine or fat, or for granulation of soap; the thread 2' of the rollers 1' is given a high and coarse profile, in such a manner that a considerable quantity of substance will be under treatment in the apparatus.

Also in this case the casing 4' of the apparatus is surrounded by a cooling jacket 5', or rather a jacket serving to maintain constantly the proper temperature. This jacket may, perhaps, be divided in such a manner that different temperatures can be maintained during the forward motion of the substance, for instance in such a manner that the temperature at the start is most suitable for the kneading and, at the finish, the temperature is most suitable for the discharge of the treated substance from the apparatus. The kneading may be supported in that the profile of the thread is made slightly narrower than the spaces between the threads, so that spaces 13' will be left between the meshing threads, the consequence being that a portion of the substance will pass back through the said spaces during the rotation of the rollers. Hereby the substance will be drawn out finely, which has a homogenizing effect. This homogenizing effect may be further increased in the following manner. Besides the rotary motion of the roller, a reciprocating motion in the axial direction is given one or both of the rollers 1', for instance by means of a device provided outside of the apparatus. This axial motion may be made asynchronous to the rotary motion of the rollers, for instance in that the two motions are produced each by a separate motor. The travel in axial direction may be made equal, or nearly equal, to the above mentioned spaces between the intermeshing threads. Hereby the further advantage is attained that similarly in this apparatus there will be no place in which the material can settle permanently. For grinding, an apparatus of nearly the same basic form is used (Fig. 2), with spaces between the threads and with axial travel of the rollers, in such a manner that there will be produced a grinding and squeezing effect on the substance. The apparatus is especially useful for fine grinding, for instance of chocolate or pigments in oil, and it can be made extremely efficient for these purposes. The apparatus possesses many favourable details, for instance many grinding surfaces in succession. By the axial travel of the rollers the substances is admitted batch-wise, and is then squeezed and ground, without any air being admitted. Nothing can adhere anywhere, and a suitable temperature can be maintained all the time.

The shaft of one of the rollers shown in Figure 2 supports a guide disc 14 moving between two fixed stops 15 and 16, so that the shaft may be reciprocated longitudinally while it is being rotated.

When the apparatus is to be used for emulsifying of fat mixtures, margarine, soap and the like (Fig. 3), a profile of thread 2" of the rollers 1" is to be used that is high and thin, and has only a small pitch. Further, the thread profile for this purpose is also slightly narrower than the thread space, so that some play 13" will be produced between the meshing threads. The rollers 1" are enclosed in a casing 4" provided with a cooling jacket 5".

The emulsion is mainly formed in the said spaces, which also will allow some axial motion of the rollers. For this purpose a rather high number of revolutions is used, and thereby the apparatus will have a tendency to convey a large quantity of substance, much larger than what is desired. If now the quantity of substance is regulated, the emulsion substances in the threads will be forced to pass the rather narrow spaces a great number of times, and at a high speed. By the frictional resistances and changing velocities thus produced a very forceful emulsification will be effected.

From the described apparatuses for emulsifying, cooling and kneading it appears that by a combination of the same a complete apparatus for continuous manufacture of margarine can be constructed in such a manner that each individual operation will be an improvement and a simplification of the operation used at present. It is further possible, although not preferable, to perform a continuous manufacture of margarine in fewer apparatuses, maybe in one single apparatus.

I claim:

Apparatus for heating, cooling, kneading, grinding, and emulsifying liquid and semi-solid substances, comprising at least two rollers situated parallel to each other, means for rotating said rollers in opposite directions, said rollers being provided with alternate left-hand and right-hand helical grooves and threads formed upon the outer surfaces of said rollers, the threads of one roller engaging in the grooves of another roller, a tightly fitting casing completely enclosing said rollers, whereby the helical grooves on the rollers form a number of at least partly closed spaces, means for circulating a heating or cooling medium adjacent said grooves, the thickness of the projecting threads being somewhat smaller than the width of the helical grooves, so that by the mutual engagement of the threads passages are formed between the projecting threads of two co-operating rollers, and means for reciprocating one of said rollers in the direction of its axis and relatively to another roller, whereby the said surfaces of said rollers will alternately approach and recede from each other.

LARS KRISTIAN VOLDSGAARD HELSTRUP.